United States Patent [19]

Tsao

[11] Patent Number: 5,384,296
[45] Date of Patent: Jan. 24, 1995

[54] THERMALLY STABLE NOBLE METAL-CONTAINER ZEOLITE CATALYST

[75] Inventor: Ying-Yen P. Tsao, Lahaska, Pa.

[73] Assignee: Mobil Oil Corporation, Fairfax, Va.

[21] Appl. No.: 106,668

[22] Filed: Aug. 16, 1993

[51] Int. Cl.⁶ .................. B01J 37/10; B01J 29/06
[52] U.S. Cl. ................................ 502/66; 502/74
[58] Field of Search .......................... 502/66, 74

[56] References Cited

U.S. PATENT DOCUMENTS

| | | | |
|---|---|---|---|
| 4,992,401 | 2/1991 | Schweizer | 502/74 |
| 5,041,401 | 8/1991 | Schoennagel et al. | 502/61 |
| 5,188,996 | 2/1993 | Huang et al. | 502/262 |
| 5,240,891 | 8/1993 | Patton et al. | 502/66 |

*Primary Examiner*—Carl F. Dees
*Attorney, Agent, or Firm*—Alexander J. McKillop; Dennis P. Santini; Laurence P. Hobbes

[57] ABSTRACT

A zeolite catalyst composition having increased resistance to agglomeration and/or migration of its noble metal component at high temperatures and a method for preparing the catalyst composition are disclosed. The zeolite catalyst composition contains non-framework multivalent alumina which is obtained by calcining the zeolite at a temperature of at least 600° C. in moist air (10 to 100 torr water).

16 Claims, No Drawings

THERMALLY STABLE NOBLE METAL-CONTAINER ZEOLITE CATALYST

BACKGROUND OF THE INVENTION

This invention relates to a noble metal-containing zeolite catalyst exhibiting enhanced high temperature resistance to agglomeration of the noble metal component(s) and to a process for preparing such a catalyst.

Noble metal-containing zeolites have been described for the catalysis of a variety of chemical conversion processes, e.g., hydroisomerization, disproportionation, hydrocracking, reforming, etc. When an aged zeolite catalyst is oxidatively regenerated to burn off accumulated carbonaceous deposits, or "coke", there is a tendency for the noble metal to migrate from the zeolite channels and to agglomerate in larger particles. This reduces the dispersion and the surface area of the noble metal available for contacting the reactants. To remedy this problem a process referred to as rejuvenation is employed in which a source of halogen such as chlorine is used to redisperse the noble metal. Frequently, chlorine rejuvenation makes matters worse, and the noble metal migrates from the zeolite to the binder material which is associated with the zeolite. When the noble metal hydrogenation component is far removed from the active acid sites of the zeolite framework, the catalyst loses selectivity. Fresh catalyst performance is rarely, if ever, obtained after current rejuvenation processes.

U.S. Pat. No. 5,041,401 to Schoennagel et al. discloses a zeolite catalyst composition resistant to agglomeration of its noble metal component by adding a non-framework multivalent metal oxide, e.g., alumina, in order to stabilize the noble metal. The non-framework component can be introduced by diffusion, impregnation, ion-exchange, and/or calcination in dry air (<100 ppm water). In one embodiment, the non-framework alumina is derived from framework aluminum subjected to dry calcination conditions. The reference specifically teaches against calcining in air exceeding 100 ppm water (<0.1 torr).

SUMMARY OF THE INVENTION

It is an object of the invention to provide a noble metal-containing zeolite exhibiting enhanced resistance to high temperature-induced agglomeration of its noble metal component.

It is another object of the invention to provide a noble metal-containing zeolite in which the noble metal is associated with non-framework alumina present within the pore channels of the zeolite.

It is a particular object of the present invention to prepare a noble metal-containing zeolite catalyst, e.g., a large pore zeolite such as zeolite, Y, X, L, mordenite, beta, etc., or an intermediate pore size zeolite such as ZSM-5, ZSM-11, ZSM-12, ZSM-23, ZSM-35, ZSM-38, ZSM-48, etc., in which the intrazeolitic noble metal component, e.g., platinum, palladium, iridium, rhodium, etc., with or without one or more non-noble metal promoters such as zinc, gallium, cobalt, molybdenum, tungsten, rhenium, etc., resists high temperature agglomeration due to being stabilized, or "anchored", within the zeolite by a non-framework aluminum oxide present within the zeolite pores.

It is yet another object of the invention to carry out a chemical conversion process, for example, isomerization, employing the foregoing thermally stable noble metal-containing zeolite catalyst.

In accordance with the aforesaid objects as well as other objects of the invention, a porous zeolite composition containing at least one noble metal component and exhibiting improved resistance of the noble metal component to agglomeration when the zeolite is exposed to high temperature is provided together with a method for obtaining the composition. The porous zeolite composition contains non-framework alumina and optionally, one or more non-framework multivalent metal oxides other than alumina, within the channels of the zeolite and a catalytically effective amount of one or more noble metals alone or associated with one or more non-noble metals, the presence of said alumina and, optionally, other multivalent metal oxide(s), resulting in a significantly increased resistance to agglomeration of the noble metal(s) at high temperature compared to substantially the same porous zeolite containing no appreciable amount of said non-framework multivalent metal oxide(s).

In one aspect, the present invention relates to a zeolite catalyst composition comprising (a) a zeolite component comprising framework aluminum, (b) non-framework alumina occupying the pores of the zeolite which alumina is derived from said framework aluminum by calcining said zeolite which has an initial $Al_2O_3$ content of at least 1 wt % at a temperature of at least 600° C. in an oxygen-containing atmosphere containing about 10 to 100 torr water for more than 1 hour and (c) a noble metal component. The presence of component (b) imparts significantly increased resistance to agglomeration and/or migration of component (c) when the catalyst composition is subjected to elevated temperature compared to an otherwise equivalent catalyst composition wherein said calcining of step b) is carried out in an oxygen-containing atmosphere containing less than 10 torr water.

In another aspect, the present invention relates to a method for preparing a zeolite catalyst composition containing at least one zeolite component and at least one noble metal component and exhibiting improved resistance of the noble metal component to agglomeration and/or migration when the zeolite composition is exposed to high temperature. The method comprises:

a) calcining said zeolite component which contains framework alumina and has an initial $Al_2O_3$ content of at least 1 wt % at a temperature of at least 600° C., in an oxygen-containing atmosphere containing about 10 to 100 torr water for more than 1 hour, thereby introducing a non-framework alumina component derived from framework aluminum into the pores of the zeolite component; and, b) introducing a noble metal component into the zeolite component, the presence of said alumina component obtained by calcining in an atmosphere containing about 10 to 100 torr water resulting in a significantly increased resistance to agglomeration and/or migration of the noble metal component at high temperature compared to an otherwise comparable zeolite catalyst composition calcined in an oxygen-containing atmosphere containing less than 10 torr water.

DESCRIPTION OF THE PREFERRED EMBODIMENTS

The zeolite containing component of the agglomeration resistant noble metal-containing zeolite catalyst of the present invention can be a large pore zeolite such as zeolite Y, rare-earth-exchanged zeolite Y, ultra-stable zeolite Y, de-aluminated zeolite Y, zeolite L, zeolite beta, ZSM-3, ZSM-4, ZSM-18, ZSM-20, a medium pore zeolite such as ZSM-5, ZSM-11, ZSM-5/ZSM-11 intermediate, ZSM-12, ZSM-23, ZSM-35, ZSM-38, ZSM-48, zeolite MCM-22, or other similar material. Zeolite Y is described in greater detail in U.S. Pat. No. 3,130,007. The entire description contained within this patent, particularly the X-ray diffraction pattern of therein disclosed Zeolite Y, is incorporated herein by reference. Zeolite L is described in U.S. Pat. No. 3,216,789. That description including the X-ray diffraction pattern of zeolite L, is incorporated by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference. ZSM-12 is described in U.S. Pat. No. 3,832,449. That description, and in particular the X-ray diffraction pattern disclosed therein, is incorporated by reference.

ZSM-18 is described in U.S. Pat. No. 3,950,449. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

Zeolite MCM-22 is more particularly described in U.S. Pat. No. 4,954,325, the entire contents of which is herein incorporated by reference.

Zeolites generally comprise a framework of silicon, aluminum, and oxygen. Other elements such as boron, titanium, or iron can also be incorporated into the framework of a zeolite.

The zeolite component contains framework alumina and has an initial $Al_2O_3$ content of at least 1 wt %, preferably greater than 3 wt %, e.g., ranging from 3 to 25 wt %.

One or more noble metals are commonly incorporated into zeolites as hydrogenation component(s). The noble metal component(s) can be selected from the metals of Group VIII of the Periodic Table of the elements and include osmium, ruthenium, rhodium, iridium, palladium and platinum. Preferably, the noble metal employed herein is platinum, rhodium or iridium, and most preferably platinum. The metals can be present in any combination desired. The amount of noble metal present in the catalyst will in any given case be an effective amount; in general, amounts of noble metal(s) ranging from about 0.1 to about 5 percent, preferably from about 0.3 to about 2 percent and still more preferably from about 0.5 to about 1.0 percent, by weight of total zeolite can be used to good effect. One or more non-noble metals can also be present, e.g., Zn, Ga, Co, Mo, Ni, Ni, W, Re, etc., as promoters. The term "metal" as used herein broadly includes both the elemental form and any compound form of the metal. Non-zeolite components of catalyst compositions include binders such as silica, alumina, or other inorganic oxide non-zeolitic materials.

The present invention is especially applicable to dual function catalysts such as zeolite beta, de-aluminized USY, ZSM-5, ZSM-11, ZSM-23, and zeolite MCM-22 which have relatively low alpha values. Excess zeolite activity is undesirable for such processes as reforming, dewaxing, and isomerization wherein cracking is to be avoided. Zeolite cracking activity, as characterized by the alpha value, is related to the number of acid sites, i.e., the framework aluminum sites. Therefore, zeolites formulated with a high silica/alumina ratio will have lower cracking activity. Reduction of acidity for already-prepared zeolites can be accomplished by several known treating methods: steaming, acid leaching, framework substitution, cation exchange, and high temperature calcination. The first three treatments are intended to remove aluminum from their framework sites either to solution or to external locations of zeolite. Among these techniques, steaming is the easiest to implement. The cation exchange approach is used to replace protons by basic cations. This technique is currently used to prepare platinum on Ba/Zeolite L for reforming naphtha. None of these treatments provide effective anchoring sites for platinum or other noble metal. Another treating method for reducing catalyst acidity, high temperature calcination, is only usable for those catalysts which can withstand high temperatures without losing crystallinity.

The disadvantage, it has been found, is that a noble metal hydrogenation component(s) such as platinum, which is incorporated into the zeolite channels, is only weakly bound to the silica. Consequently, the noble metal atoms can readily migrate and agglomerate during catalyst regeneration and do, in fact, do so.

It has been discovered that noble metal components of zeolite catalysts are more strongly bound to non-framework alumina and optional multivalent metals occupying the zeolite pores, or channels, than to any of the zeolitic framework components or to the binder material with which the zeolite may be composited. Platinum or other noble metal will, in fact, migrate out of the channels of a highly silicaceous zeolite onto an alumina rich binder. Hence, the present invention contemplates a way of incorporating alumina (or other stabilizing metal oxide component) into the channels of a zeolite. The non-framework alumina serves to bind the noble metal without, however, affecting the catalytic properties of the zeolite in any appreciable way. Hence, the method of the present invention can be usefully employed in those applications where a low alpha value is desired or required. Hydroisomerization, for example, requires both acid and hydrogenation functions in the zeolite catalyst. Moreover, the acid component of the zeolite framework (e.g., framework aluminum) must be in proximity to the hydrogenation component (e.g., platinum) so that olefinic species can be rehydrogenated to isoparaffins without being cracked to light products.

Although the mechanism by which aluminum oxides achieve stabilization (considered as resistance of the noble metal to agglomeration or migration at high temperatures) is not known with certainty, it has been speculated that they serve as "anchoring" sites for the noble metal preventing or minimizing its tendency to agglomerate and/or migrate from the zeolite. Regardless of the actual mechanism involved, the fact remains that the presence of the alumina within the pores or channels of the zeolite effectively inhibits noble metal agglomeration/migration.

Examples of optional multivalent metal oxide stabilizing components other than alumina which can be used to good effect include oxides of metals of: Group IIA such as magnesium, barium and calcium; Group IVB such as zirconium; and, Group IIIA such as gallium and indium. The Group IIIA metal oxides are preferred and of these, the aforementioned oxides are particularly preferred.

The amounts of metal oxide stabilizing component required for effective noble metal agglomeration/migration resistance can vary within relatively large limits and in general will be related to the nature and amount of the particular noble metal employed, the specific zeolite utilized, the conditions of the conversion process, particularly the temperature, in which the zeolite is employed, the specific metal oxide stabilizing component utilized and other factors apparent to those skilled in the art. Specific amounts of metal oxide stabilizing components can be readily determined in a particular case employing routine experimentation. In the case of zeolite containing from about 0.05 to 5 weight percent noble metal and preferably 0.2 to 1 weight percent platinum, a mole ratio of nonzeolitic oxide (e.g. aluminum oxide) to noble metal of from about 1:1 to 100:1, and preferably from about 4:1 to about 20:1, is generally effective.

High temperature calcination in moist air (>10 torr) is employed in the present invention using zeolites capable of withstanding temperatures between 600°–1000° C., prior to incorporation of the noble metal in the zeolite. This method dislodges framework aluminum and oxidizes it to form intrazeolitic (i.e. non-framework) aluminum oxide. Hence, with respect to high temperature calcination, the addition of aluminum is optional, but not necessary for the stabilization of noble metals. Unlike framework aluminum, which provides acidity and catalyst activity but does not bind noble metal atoms, the non-framework intrazeolitic alumina does not provide acidity or catalyst activity but does bind noble metals.

The calcination prior to incorporation of noble metal is carried out in a flowing gas of nitrogen, air, flue gas, or other suitable environment, preferably in an oxygen-containing atmosphere, e.g., air, said flowing gas containing about 10 to 100 torr water, preferably about 12 to 80 torr water, at temperatures greater than about 600° C., preferably ranging from 700° C. to 800° C., say from 750° C. to 795° C., for at least one hour, preferably more than 1 hour but less than 3 hours.

Although calcination in moist air has been a known method to reduce catalytic cracking activity of certain zeolites, its use as part of a method to increase the thermal stability of noble metals in zeolites is both novel and unexpected, given prior art teaches away from calcining in more than trace moisture conditions. When calcining is discussed it should be remembered that the severity of calcining is related to the temperature, moisture content, and duration of heating. Thus, a higher calcining temperature requires a shorter heating time to achieve a predetermined severity.

The invention herein also contemplates a variety of methods to incorporate optional stabilizing metal oxide(s) other than alumina into the zeolite channels. Some of the methods achieve the addition of metal oxide(s) by ion exchange or gaseous diffusion.

Various methods of adding metal oxides which are not derived from zeolitic framework metals are described below.

Gaseous diffusion can be used as a method of incorporating additional non-zeolitic alumina or other trivalent metal oxide species into the channels of a zeolite. A zeolite in the ammonium or hydrogen form is exposed to a dry aluminum chloride gas, e.g., at from about 185° C. to about 400° C. The aluminum chloride gas is deposited to the desired level. The catalyst is subjected to conditions effecting the hydrolysis of the aluminum chloride component followed by calcination in air at from about 700° C. to the maximum tolerable temperature to provide aluminum oxide. The maximum tolerable temperature is the upper limit of the temperature range at which the zeolite undergoes no more than 50% loss of crystallinity. For ZSM-5 the maximum tolerable temperature is about 1000° C., for zeolite beta it is about 900° C., and for MCM-22 it is about 1200° C. The catalyst can then be formed by, for example, extrusion methods, with or without a binder. After the catalyst has undergone treatment and forming, platinum is then ion exchanged to the desired level by conventional techniques. The catalyst is then dried in air at about 350° C.

Another useful technique employs impregnation. Thus, the selected zeolite can be impregnated with a solution of a nitrate, or other soluble aluminum oxide salt or other suitable metal oxide salt, then calcined in air to convert the salt to metal oxide. Following ion-exchange with platinum cations to the desired level, the catalyst is calcined and shaped as in the gaseous diffusion method referred to above. If desired, the small amount of aluminum at the outer surface of the zeolite can be washed away with dilute acid.

Yet another useful procedure for incorporating the metal oxide stabilizing component utilizes ion exchange techniques which in themselves are known. Thus, e.g., a steamed zeolite extrudate with or without binder is ion-exchanged with aluminum or other suitable metal cation and then calcined at appropriate temperatures to convert the metal cation to metal oxide. The catalyst is then ion exchanged with platinum cations to the desired level. Considering the relatively large size of hydrated aluminum cations, the effectiveness of this procedure for introducing non-zeolitic alumina into the zeolite is altogether surprising.

Calcination at sufficiently high temperatures in air or inert atmosphere is necessary to convert the above-mentioned metal to their oxides: cationic forms of the metals produced by ion exchange alone are not effective as stabilizing agents. The calcining method of the present invention reduces zeolite alpha in proportion to the severity of the calcination. A higher temperature will reduce alpha value more than a lower temperature, all other factors being equal. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an alpha of 1 (Rate Constant=0.016 sec-1). The alpha test is described in U.S. Pat. No. 3,354,078; in the *Journal of Catalysis*, vol. 4, p. 527 (1965); vol. 6, p. 278 (1966); and vol. 61, p. 395 (1980), each incorporated herein by reference as to that description. The experimental conditions of the test used herein include a constant temperature of 538° C. and a variable flow rate as described in detail in the *Journal of Catalysis*, vol 61, p. 395.

Alpha provides a measure of framework alumina. The reduction of alpha indicates that a portion of the framework aluminum is being lost. It is believed that when alpha reduction is accomplished by the high temperature calcination method of the present invention this portion of aluminum is dislodged from the framework and thereupon takes up residence within the pores of the zeolite as intrazeolitic (i.e. non-framework) alumina. The reduction of alpha value should be at least 50%, preferably 70% and more preferably 90%. It should be noted, though, that alpha reduction by other methods, such as steaming, does not achieve the improved noble metal agglomeration/migration resistance of the present invention. These metal oxide incorporation procedures described above are applicable to stabilization of noble metals on all zeolites such as ZSM-5, MCM-22, HY, REY, REX, ZSM-11, ZSM-12, mordenite, erionite, etc. The bifunctional catalysts, e.g., Pt/zeolite beta, Pd/HY, Pt/ZSM-5, Pt/ZSM-12 are useful in the catalysis of processes such as hydroisomerization, reforming, hydrocracking, hydrotreating, dehydrocyclization and dimerization.

The following examples provide additional details with respect to the present invention.

By way of simulating the agglomeration of noble metal which occurs during the high temperature burn-off of accumulated coke on a zeolite, wet air sintering is carried out at about 540° C. for 16 hours at about 14 torr partial pressure of water on a platinum-containing zeolite beta. Platinum dispersion is measured by hydrogen chemisorption technique and is expressed in terms of H/Pt ratio. The higher the H/Pt ratio, the higher the platinum dispersion. For example, a freshly prepared Pt/zeolite beta extrudate had an H/Pt ratio of 1.33. After wet air sintering the H/Pt ratio dropped to about 0.19. This is comparable to the reduction in platinum dispersion which occurs during catalyst regeneration by coke burn off.

While platinum is used to exemplify the methods, it should be understood that other noble metals are also contemplated therein.

Zeolite beta of the examples is available in the art and can be prepared in accordance with known procedures.

EXAMPLES 1 to 6

Zeolite beta was prepared in accordance with known methodology. The as-synthesized zeolite beta had a silica/alumina ratio of 40. It was heated at 450° C. in nitrogen for 4 hours and then at 530° C. in air for 4 hours. It was then exchanged with 1M ammonium chloride solution. The zeolite possessed an alpha value of 427 at this point.

The zeolite was then divided into 10 portions of 10 grams each. The first six portions (Examples 1 to 6) were calcined in flowing (12.5 cc/min/gram catalyst) moist air (14 to 100 torr water) with the temperature raised at the rate of about 10° C./min from ambient to 60° C. below the final calcining temperature, at 2° C./min to 10° C. below the final temperature, then at 1° C./min to the final calcining temperature ranging from 700° to 800° C. for 1 to 3 hours, resulting in alpha values ranging from 50 to 260. Specific conditions are set out in the Table below. The samples were then exchanged with a platinum salt, $Pt(NH_3)_4(NO_3)_2$, in accordance with known conventional methods of ion exchange, and then heated in 40 cc/min/gram catalyst of dry air ($<0.1$ torr) with the temperature being raised at 0.5° C./min to 350° C., and held at 350° C. for 4 hours. The resulting zeolites had platinum contents ranging from 0.53 to 0.68% and H/Pt ratios of about 1.3, indicating Pt particles on these catalysts are very highly dispersed, i.e. $<10$ Å.

To simulate the agglomeration effect of decoking the zeolites were then heated to 540° C. (1004° F.) in wet air (14 torr water) for 16 hours. The resulting zeolites treated in accordance with the present invention (Examples 1 to 5) had only slightly reduced H/Pt ratios (1.14 to 0.87) as shown in the Table. Example 6 which was subjected to moist air calcination for only 0.25 h exhibited substantially reduced H/Pt ratio of 0.48.

EXAMPLE 7 (Comparative)

A boron-containing zeolite beta prepared according to conventional procedures containing 7.44% $B_2O_3$ and 0.23% $Al_2O_3$. It was heated at 450° C. in nitrogen for 4 hours and then at 530° C. in air for 4 hours. It was then exchanged with 1M ammonium chloride solution. The zeolite possessed an alpha value of 5 at this point.

The zeolite was then calcined in flowing (12.5 cc/min/gram catalyst) moist air (14 torr water) with the temperature raised at the rate of about 10° C./min from ambient to 727° C., at 2° C./min from 727° to 777° C., then at 1° C./min from 777° to 787° C. and held at 787° C. for 1 hour, resulting in alpha values of 5. Specific conditions are set out in the Table below. The samples were then exchanged with a platinum salt $Pt(NH_3)_4(OH)_2$, in accordance with known conventional methods of ion exchange, and then heated in 40 cc/min/gram catalyst of dry air ($<0.1$ torr) with the temperature being raised at 0.5° C./min to 350° C., and held at 350° C. for 4 hours. The resulting zeolites had a platinum content of 0.57% and an H/Pt ratio of 1.57.

After the wet air treatment to simulate the agglomeration of a coke burn-off the zeolite exhibited an H/Pt ratio of only 0.12. The very poor Pt stabilization observed for the boron-containing zeolite beta catalyst suggests that non-framework alumina species are responsible for Pt stabilization.

EXAMPLE 8 (Comparative)

A portion of the ammonium exchanged zeolite of Examples 1 to 6 was calcined in dry nitrogen at the above-mentioned flow rate and rate of temperature increase to a maximum temperature of 800° C. and was held at 800° C. for 2 hours. The resulting zeolite had an alpha value of 160. The platinum exchange and air drying steps were carried out as for Examples 1 to 6. The resulting zeolite had a platinum content of 0.60% and an H/Pt ratio of 1.24.

After the wet air treatment to simulate the agglomeration of a coke burn-off the zeolite exhibited an H/Pt ratio of only 0.58.

EXAMPLE 9 (Comparative)

A portion of the zeolite of Examples 1 to 6 after exchange with 1M ammonium chloride solution possessing an alpha value of 427 was subjected to the platinum exchange and air drying steps as for Examples 1 to 6, without calcining. The resulting zeolite had a platinum content of 0.62% and an H/Pt ratio of 1.46.

After the wet air treatment to simulate the agglomeration of a coke burn-off the zeolite exhibited an H/Pt ratio of only 0.21.

EXAMPLE 10 (Comparative)

A zeolite beta was synthesized in accordance with known methodology and ammonium exchanged. It was then treated with 100% steam at 700° C. for 4 hours to reduce its alpha value. After steaming the zeolite had an alpha of 8.

It was then platinum exchanged by standard methodology as in the previous examples and heated in dry air at 0.5° C./min up to 350° C. whereupon the 350° C. temperature was maintained for 4 hours. The resulting zeolite had a Pt content of 0.58% and an H/Pt ratio of 0.82.

After wet air treatment to simulate the agglomeration produced by decoking, the zeolite had an H/Pt ratio of 0.33.

aluminum by calcining said zeolite which has an initial $Al_2O_3$ content of at least 1 wt % at a temperature of at least 600° C. in an oxygen-containing atmosphere containing about 10 to 100 torr water for more than 1 hour and (c) a noble metal component, the presence of component (b) imparting significantly increased resistance to agglomeration and/or migration of component (c) when the catalyst composition is subjected to elevated temperature compared to the catalyst composition wherein said calcining of step b) is carried out in an oxygen-containing atmosphere containing less than 10 torr water.

2. The catalyst composition of claim 1 wherein said non-framework alumina is derived from said framework aluminum by calcining said zeolite which has an initial $Al_2O_3$ content greater than 3 wt % at a temperature ranging from 700° C. to 800° C. in air containing about 14 to 100 torr water for more than 1 hour but less than 6 hours.

3. The catalyst composition of claim 1 wherein said zeolite is zeolite beta and said non-framework alumina is derived from said framework aluminum by calcining said zeolite which has an initial $Al_2O_3$ content of 3 to 25 wt % at a temperature of ranging from 700° C. to 800° C. in air containing about 14 to 100 torr water for more than 1 hour but less than 3 hours.

4. The catalyst of claim 1 wherein the zeolite component is an intermediate pore size zeolite.

5. The catalyst of claim 1 wherein the zeolite component is selected from the group consisting of ZSM-5, ZSM-3, ZSM-4, ZSM-11, ZSM-12, ZSM-18, ZSM-20, ZSM-23, ZSM-35, ZSM-38, ZSM-48, zeolite beta, zeolite MCM-22, zeolite Y, zeolite USY, zeolite L, zeolite X, and mordenite.

6. The catalyst of claim 1 wherein the zeolite is a large pore size zeolite.

7. The catalyst of claim 1 wherein the zeolite component contains at least one framework element other than aluminum.

8. The catalyst of claim 1 wherein the zeolite component contains at least one framework element selected from the group consisting of boron, titanium, iron, and any combination thereof.

TABLE

Dispersion of Platinum on Various $C_{56}$ Supports

| Example | Dealumination Condition | | | $\alpha$ Value | Pt Content (%) | H/Pt Ratio** | |
|---|---|---|---|---|---|---|---|
| | Temp, °C. | $H_2O$ (Torr) | Time (hr) | | | Fresh | Sintered* |
| Moist-air Treated Zeolite Beta | | | | | | | |
| 1 | 759 | 17 | 3 | 85 | 0.53 | 1.32 | 1.14 |
| 2 | 770 | 14 | 1 | 214 | 0.59 | — | 0.94 |
| 3 | 795 | 50 | 3 | 52 | 0.65 | — | 0.91 |
| 4 | 757 | 50 | 1 | 158 | 0.68 | — | 1.05 |
| 5 | 695 | 100 | 1 | 262 | 0.62 | — | 0.87 |
| 6 | 773 | 50 | 0.25 | 525 | 0.60 | — | 0.48 |
| Moist-air Treated [B] Zeolite Beta | | | | | | | |
| 7 | 787 | 14 | 1 | 5 | 0.57 | 1.57 | 0.12 |
| Dry-$N_2$ Treated Zeolite Beta | | | | | | | |
| 8 | 800 | <0.1 | 2 | 160 | 0.60 | 1.24 | 0.58 |
| Untreated Zeolite Beta | | | | | | | |
| 9 | — | — | — | 427 | 0.62 | 1.46 | 0.21 |
| Steamed Zeolite Beta | | | | | | | |
| 10 | 700 | 760 | 4 | 8 | 0.58 | 0.82 | 0.33 |

*After being subjected to a 540° C., 16 hour treatment in wet air containing 14 Torr water
**prior to ambient temperature hydrogen chemisorption, catalysts were $H_2$ reduced at 450° C. for 30 minutes.

What is claimed is:

1. A zeolite catalyst composition comprising (a) a zeolite component comprising framework aluminum, (b) non-framework alumina occupying the pores of the zeolite which alumina is derived from said framework 9. The catalyst of claim 1 wherein the noble metal is at least one metal selected from the group consisting of platinum, palladium, iridium and rhodium and any combination thereof.

10. The catalyst of claim 1 wherein the noble metal is associated with at least one non-noble metal.

11. The catalyst of claim 1 wherein the noble metal is present at a level of from about 0.05 to about 5.0 weight percent of the zeolite.

12. The catalyst of claim 1 wherein the mole ratio of the non-framework alumina to the noble metal is from about 1:1 to about 100:1.

13. The catalyst of claim 1 wherein the mole ratio of the non-framework alumina to the noble metal is from about 4:1 to about 20:1.

14. A method for preparing a zeolite catalyst composition containing at least one zeolite component and at least one noble metal component and exhibiting improved resistance of the noble metal component to agglomeration and/or migration when the zeolite composition is exposed to high temperature which comprises:
  a) calcining said zeolite component which contains framework alumina and has an initial $Al_2O_3$ content of at least 1 wt % at a temperature of at least 600° C., in an oxygen-containing atmosphere containing about 10 to 100 torr water for more than 1 hour, thereby introducing a non-framework alumina component derived from framework aluminum into the pores of the zeolite component; and,
  b) introducing a noble metal component into the zeolite component,
  the presence of said alumina component obtained by calcining in an atmosphere containing about 10 to 100 torr water resulting in a significantly increased resistance to agglomeration and/or migration of the noble metal component at high temperature compared to an otherwise comparable zeolite catalyst composition calcined in an oxygen-containing atmosphere containing less than 10 torr water.

15. The method of claim 14 wherein said non-framework alumina is derived from said framework aluminum by calcining said zeolite which has an initial $Al_2O_3$ content greater than 3 wt % at a temperature ranging from 700° C. to 800° C. in air containing about 14 to 100 torr water for more than 1 hour but less than 3 hours.

16. The method of claim 14 wherein the zeolite component is selected from the group consisting of ZSM-5, ZSM-3, ZSM-4, ZSM-11, ZSM-12, ZSM-18, ZSM-20, ZSM-23, ZSM-35, ZSM-38, ZSM-48, zeolite beta, zeolite MCM-22, zeolite Y, zeolite USY, zeolite L, zeolite X, and mordenite.

* * * * *